Patented Aug. 26, 1930

1,773,974

UNITED STATES PATENT OFFICE

CARLETON ELLIS, OF MONTCLAIR, NEW JERSEY

FILM

No Drawing.  Application filed September 23, 1926. Serial No. 137,380.

This invention relates to a duplex or composite film containing a cellulose ester such as cellulose acetate or nitrate or other soluble cellulose compound and relates especially to a duplex film comprising a pigmented layer and a non-pigmented or substantially transparent film comprising nitrocellulose and a synthetic resin compatible therewith. Such a film may be prepared on a supporting non-adherent surface by applying thereto solutions which on drying yield coatings of the desired duplex or composite character and such coating or film may then be stripped from the supporting surface. Or, the supporting surface may be of a highly adherent character and the film may then be allowed to remain thereon for an indefinite period for decorative and protective purposes. In such a case there is obtained a film comprising a pigmented substratum adjacent a supporting surface and a superposed and exposed substantially transparent protecting stratum comprising nitrocellulose and said synthetic resin.

The pigmented layer or substratum as the case may be, may be an oil paint, colored varnish, or any other suitable material preferably of a flexible character. Nitrocellulose with resin and pigment are desirable and constitute the preferred form. The pigmented layer or substratum may be in direct contact with a supporting surface, or in contact with a primer or intermediate attaching layer. The substratum may consist of a plurality of layers if thereby a better pigmented effect is secured.

When the film is applied to a supporting surface the protecting and exposed stratum consists of or contains nitrocellulose and a synthetic resin compatible therewith. This stratum is preferably free from pigment, or contains comparatively little pigment or filling material, whereby a fine lustrous effect is obtained. Pigment tends to dull the gloss and if used in large proportion also has other disturbing effects.

As a synthetic resin I prefer those made from glycerol (or glycol, pentaerythritol, and the like, or mixtures of these various polyhydric aliphatic alcohols) and a crystalline acid or anhydride such as phthalic acid or anhydride, together with the free fatty acid or a glyceride oil, particularly the various vegetable oils such as the fatty acids of linseed oil, cottonseed oil, soya bean oil, rapeseed oil, and the like. Resins of this general character greatly increase the life of the nitrocellulose films as compared with films made from the same nitrocellulose with a like proportion of rosin, damar, and other natural resins. These oil-acid-glyceride resins give to nitrocellulose a greater durability than that secured with modified natural resins such as rosin ester, or ester gum. However, I do not limit myself to synthetic resins of the glyceride type, but may employ other synthetic resins, or mixtures of these with themselves or with natural resins, or modified natural resins such as rosin ester. The aforesaid supporting surface may be of wood, metal, cement, plaster, and the like. When special adherence is desired such surface may be treated with a priming, filling or adhesive composition before the duplex film of the present invention is produced. On the other hand the duplex film may be formed on, for example, a sheet of glass, which, for the purpose, is treated with a suitable substance to allow ready stripping. After the duplex film has been formed and has been allowed to dry, such film is stripped from its support. Or the pigmented layer or substratum may be formed and stripped and the transparent layer subsequently applied thereto. Or conversely the stratum or glossy layer may first be formed and a backing of pigmented material applied thereto.

Nitrocellulose is impaired in durability by the addition of most of the natural resins and the life of a film or coating is shortened in proportion to the amount of such resin introduced. Films are desired containing a considerable amount of resin in order to obtain a considerable degree of thickness with the application of only one or two coats of a solution containing such resin and nitrocellulose. On the other hand all of the synthetic resins compatible with nitrocellulose improve the life of nitrocellulose films and cooperate, for example, with nitrocellulose of low viscosity to yield very durable films or coatings. Among the synthetic resins appropriate for the purpose, compatible with nitrocellulose of low viscosity and soluble in the solvents employed for nitrocellulose, are those made from an oily fatty acid, a polyhydric alcohol such as glycerol and an organic acid, of what may be generally termed the crystalline type, including tartaric, citric, malic, benzoic, phthalic, and similar acids or less definitely crystallizable acids of the type of lactic. A resin made from glycerol and one of these crystalline acids as a rule exhibits imperfect solubility or lack of water resistance, but when a resin complex is made from the free fatty acid of a vegetable oil, as for example, the fatty acids of cottonseed oil, glycerol, and a second organic acid, such as those represented by phthalic acid of the crystalline group aforesaid, resins may be obtained which have improved solubility and higher water resistance and endurance. Moreover, they are compatible with nitrocellulose and cooperate with the less durable low viscosity nitrocellulose to yield highly durable films or coatings.

As an illustration of the present invention a composition was made from 2 parts by weight of cottonseed phthalic glyceride resin, 1 part of one-half second viscosity nitrocellulose, 1 part zinc oxide, ½ part Prussian blue, ¼ part blown castor oil, ¼ part dibutyl phthalate, 5½ parts secondary butyl acetate and 5½ parts secondary butyl alcohol. Copper-steel panels were amalgamated with mercury to form a surface from which films could be readily stripped. Two coats of this pigmented composition were applied to the panels. After this substratum was dry a non-pigmented solution composed of 2 parts by weight of cottonseed phthalic glyceride resin to ½ part of ½ second nitrocellulose and 3½ parts each of secondary butyl acetate and secondary butyl alcohol was applied to the pigmented substratum. When this coating or stratum was dry the duplex film was stripped from the panel. A blue opaque film was obtained, the pigmented side or substratum of which had a matt surface or eggshell gloss, while the other side containing the stratum or unpigmented material was very glossy. This film was flexible and quite tough.

In like manner another film was prepared by applying to a panel in a similar manner two flow coats of a pigmented composition consisting of 2 parts by weight of one-half second nitrocellulose, 1 part zinc oxide, ½ part Prussian blue, ¾ part each of blown castor oil and dibutyl phthalate and 8 parts each of secondary butyl acetate and secondary butyl alcohol. After this pigmented substratum had been formed and dried, one flow coat of a composition consisting of castor oil phthalic glyceride resin, 2 parts; one-half second nitrocellulose, ½ part; and secondary butyl acetate and secondary butyl alcohol each 3½ parts was applied. After this stratum had dried the duplex film which resulted was stripped from the panel and an opaque blue film was obtained of excellent flexibility and strength, the substratum side of which was dull and practically free from gloss, while the other side was very lustrous.

The composition set forth for making the stratum or lustrous finish preferably is one which shows remarkable endurance to weather, even though low viscosity nitrocellulose be employed. The high degree of compatibility of low viscosity nitrocellulose, e. g., one-half second nitrocellulose, with the vegetable oil fatty acid phthalic glyceride resins secures a cooperative effect whereby the tendency of the low viscosity nitrocellulose films to disintegrate on exposure is overcome by the presence of the resin and a durable product results. Hence such a coating may be applied to advantage over pigmented coatings on wood, metal, or other surfaces, and the resulting film will be found to have not only a satisfactory and pleasing high lustre, but also a degree of resistance to weather which makes possible a wide field of application.

What I claim is:—

1. A stratified film, a stratum of which contains pigment and another stratum devoid of pigment and substantially transparent which comprises nitrocellulose and a synthetic resin compatible therewith.

2. A duplex film, one side of which is pigmented and substantially without lustre, the other side of which is non-pigmented and lustrous, the latter containing nitrocellulose and a synthetic resin of the oily fatty acid phthalic glyceride type.

3. A film serving as a coating on a supporting article comprising a pigmented substratum adjacent a supporting surface of said article and a superposed and exposed substantially transparent protecting stratum comprising nitrocellulose and a synthetic resin compatible therewith.

4. A film serving as a coating on a supporting article comprising a pigmented substratum adjacent a supporting surface of said article and a superposed and exposed substantially transparent protecting stratum comprising nitrocellulose and a synthetic resin of the oil glyceride type.

5. A stratified film, the stratum of which contains pigment and another stratum devoid of pigment and substantially transparent, which comprises nitrocellulose and a synthetic glycol resin compatible therewith.

6. A film serving as a coating on a supporting article comprising a pigmented substratum adjacent a supporting surface of said article and a superposed and exposed substantially transparent protecting stratum comprising nitrocellulose, a synthetic resin of the oily fatty acid phthalic polyhydric-aliphatic-alcohol type.

7. A stratified film, one stratum of which contains nitrocellulose and a pigment, and another stratum of which is substantially transparent and contains nitrocellulose and a synthetic resin compatible therewith.

8. A film serving as a coating on a supporting article, comprising a pigmented substratum adjacent a supporting surface of said article and a superposed and exposed substantially transparent protecting stratum comprising nitrocellulose and a synthetic resin of the glyceride type made from an aliphatic alcohol containing more than one hydroxy group and from two to four or more carbon atoms.

9. A stratified film, one stratum of which contains pigment and another stratum of which comprises low viscosity nitrocellulose and a preservative synthetic resin compatible therewith.

10. A film serving as a coating on a supporting article comprising a primer adjacent said supporting surface of said article, an intermediate pigmented substratum adjacent said primer, and a superposed and exposed substantially transparent protecting stratum comprising nitrocellulose and a synthetic resin compatible therewith.

11. A film serving as a coating on a supporting article comprising a pigmented substratum adjacent a supporting surface of said article, and a superposed and exposed protecting stratum comprising nitrocellulose, a synthetic resin compatible therewith, and pigment, the amount of pigment in the exposed stratum being insufficient to dull the gloss of that stratum.

12. A stratified film, a stratum of which contains pigment and another stratum of which is devoid of pigment and comprises a cellulose ester and a synthetic resin compatible therewith.

13. A stratified film, a stratum of which contains pigment and another stratum of which comprises nitrocellulose, a synthetic resin compatible therewith, and rosin ester.

14. A stratified film, a stratum of which contains pigment and another stratum of which comprises nitrocellulose and a synthetic resin compatible therewith, the amount of resin exceeding the amount of nitrocellulose.

15. A film serving as a coating on a supporting article, said film comprising a pigmented substratum and a further stratum which comprises low viscosity nitrocellulose and a synthetic resin of the oily fatty acid phthalic glyceride type.

16. A film comprising a pigmented substratum and a superposed protecting stratum comprising low viscosity nitrocellulose and a synthetic resin of the oil glyceride type.

CARLETON ELLIS.